United States Patent [19]
Brosda et al.

[11] Patent Number: 5,873,087
[45] Date of Patent: Feb. 16, 1999

[54] COMPUTER SYSTEM FOR STORING DATA IN HIERARCHICAL MANNER

[75] Inventors: Volkert Brosda, Leimen; Volker Obermeit, Darmstadt, both of Germany

[73] Assignee: International Business Machines Corporation, Armonk, N.Y.

[21] Appl. No.: 916,770

[22] Filed: Jul. 17, 1992

[30] Foreign Application Priority Data

Jul. 18, 1991 [EP] European Pat. Off. ............... 91112007

[51] Int. Cl.⁶ .................................................. G06F 12/00
[52] U.S. Cl. .......................... 707/100; 707/101; 707/102; 707/103; 707/104
[58] Field of Search ..................... 395/600, 275, 395/650; 364/419.08, 419.17; 707/100, 101, 102, 103, 104

[56] References Cited

U.S. PATENT DOCUMENTS

| | | | |
|---|---|---|---|
| 4,481,577 | 11/1984 | Forson | 395/600 |
| 4,606,002 | 8/1986 | Waisman | 395/600 |
| 4,677,550 | 6/1987 | Ferguson | 395/600 |
| 4,893,232 | 1/1990 | Shimaoka et al. | 364/200 |
| 5,060,155 | 10/1991 | van Zuijlen | 364/419.08 |
| 5,247,666 | 9/1993 | Buckwold | 395/600 |
| 5,274,806 | 12/1993 | Hill | 395/600 |
| 5,295,261 | 3/1994 | Simonetti | 395/600 |
| 5,303,367 | 4/1994 | Leenstra | 395/600 |

FOREIGN PATENT DOCUMENTS 0309798  5/1989  European Pat. Off. .

OTHER PUBLICATIONS

T940,012—USPTO Defensive Publication, Nov. 4, 1975, T. Beretvas et al. "Rules Driven Data Management Process".

*Primary Examiner*—Thomas G. Black
*Assistant Examiner*—Jean R. Homere
*Attorney, Agent, or Firm*—Arthur J. Samodovitz

[57] ABSTRACT

The invention concerns a computer system for data administration, wherein a number of data fields are stored in a memory. The data fields are subdivided into data segments. For each data segment, the associated structural and ordering information is stored in the memory. The structural information serves to describe the type of data segment. The structural information is also used to define the path from the location of the data segment within an associated structure tree to its root. The ordering information serves to determine the order of the data segment within a data field. By storing in particular the structural information, it is possible to use that information for queries. The structural information may also be used for indexing. As a result, the speed of the query process is substantially increased.

18 Claims, 3 Drawing Sheets

"ab|bren|nen <unr. V.>: 1. <hat> a) durch Brand zerstören, niederbrennen: eine alte Baracke a.; ganze Dörfer wurden abgebrannt b) durch Feuer von etw. befreien, reinigen, säubern

```
<entry>              =
  <hf>               =
    <lemma>          = ab|bren|nen
    <gr>             =                          17
      <wortart>      =
        <wortart_text> = unr. V.
  <semulp>           =
    <semulp_nr>      = 1.
    <gr>             =
      <hilfsverb>    = hat
    <semu2p>         =
      <semu2p_nr>    = a)
      <bed>          =
        <bed_text>   = durch Brand zerstören, niederbrennen
      <bsp>          =
        <bsp_text>   = eine alte Baracke a.
      <bsp>          =
        <bsp_text>   = ganze Dörfer wurden abgebrannt
    <semu2p>         =
      <semu2p_nr>    = b)
      <bed>          =
13    <bed_text>     = durch Feuer von etw. befreien, reinigen, säubern
```
•
•
•

FIG. 4

13
```
<entry>        : followed by a dictionary entry
<hf>           : main form
<lemma>        : lemmatized form
<gr>           : grammatical detail
<wortart>      : type of word
<wortart_text> : text pertaining to type of work
<semulp>       : semantic subdivision of the first category
<semulp_nr>    : numerical information for a semantic subdivision of the first category
<semu2p>       : semantic subdivision of the second category
<semu2p_nr>    : numerical information for a semantic subdivision of the second category
<bed>          : semantic information
<bed_text>     : text pertaining to semantic information
<bsp>          : example
<bsp_text>     : example text
<hilfsverb>    : auxiliary verb
```

|  |  |  |  |
|---|---|---|---|
| 12 15 | | 13 | 14 |
| 10 { 471 <hf> <entry> ab\|bren\|nen —17 | | <lemma> | 100 111 —16 |
| 10 { 471 <wortart> <gr> <hf> <entry> unr. V. —17 | | <wortart_text> | 200 1 1 1 1 1 |
| 471 <semulp> <entry> 1. | | <semulp_nr> | 300 1 1 1 |
| 471 <gr> <semulp> <entry> hat | | <hilfsverb> | 400 1 1 1 1 |
| 471 <semu2p> <semulp> <entry> a) | | <semu2p_nr> | 500 1 1 1 1 |
| 471 <bed> <semu2p> <semulp> <entry> durch Brand zerstören, niederbrennen | | <bed_text> | 600 1 1 1 1 1 |
| 471 <bsp> <semu2p> <semulp> <entry> eine alte Baracke a. | | <bsp_text> | 700 1 1 1 1 1 |
| 471 <bsp> <semu2p> <semulp> <entry> ganze Dörfer wurden abgebrannt | | <bsp_text> | 800 1 2 1 1 1 |
| 471 <semu2p> <semulp> <entry> b) | | <semu2p_nr> | 900 1 2 1 1 |
| 471 <bed> <semu2p> <semulp> <entry> durch Feuer von etw. befreien, reinigen, säubern | | <bed_text> | 1000 1 1 2 1 1 |

FIG. 5

COMPUTER SYSTEM FOR STORING DATA IN HIERARCHICAL MANNER

BACKGROUND OF THE INVENTION

The invention concerns a computer system for data administration, with memory means storing at least one data field.

In such database systems, all the data items are stored in tabular data fields. Thus, for example, each row of a customer table contains a consecutive customer number, the name and the address of the customer, etc. A second table stores any deliveries the customer has previously received. Each row of the latter table contains the customer number to which deliveries have been made, as well as the respective date of delivery, the name and the quantity of the delivered article, etc. In the described example, both tables are linked by the customer number. The query as to which deliveries a customer x received on a particular date y is answered by the database in that initially the number associated with customer x is determined, and that the second table is searched for the total number of deliveries stored under his customer number and which, in addition, were made on the specified date y. New customers may subsequently be stored in the table at any time. Similarly, the second table may be updated on deliveries made.

However, subsequent changes in the database structure, if at all possible, necessitate revising the applications based thereon. This means that when the tables are drawn up, any potential requirements, in particular those to be met by the database, must be considered. If, in addition to the aforementioned data, the described customer table is to comprise, for example, a BTX number for each customer, a new table has to be prepared in which each customer number is associated with a BTX number. The customer numbers which have to be repeated for this purpose require an almost intolerable amount of memory space in particular in large databases. To avoid wasting memory space in that way, the customer table has to be supplemented by a further column with the BTX numbers. However, this is very expensive and time-consuming, as it entails changing a major part of the stored data and application programs.

It is the object of the invention to provide a computer system for data administration, wherein structural changes may be easily made.

SUMMARY

According to the invention, this object is accomplished by a computer system for data administration of the above-described kind in that the data field is subdivided into data segments, and that structural information is stored for each data segment.

The structure of the database system is stored as structural information. This structural information forms a structure tree for each data field. The number of admissible structure trees is determined by a grammar. For changing the structure within the admissible structure trees, only the structural information has to be altered. Thus, when the database is prepared, it is no longer necessary to have a rigidly defined structure, since subsequent changes in the structural information are easy to make. By changing the underlying grammar it is also possible to change the number of admissible structure trees.

The invention allows administrating diverse structures and simultaneously supporting search and change operations. Similarly, known functions, in particular those occurring in relational database systems, such as recovery mechanisms, multiuser capability or transaction administration, may be utilized.

Embodiments of the invention comprise as a first item of structural information, a label describing the type of data segment, as a second item of structural information, a label sequence describing the path from the root of a structure tree to the data segment, and as a third item of structural information, a path definition which, based on the same label sequence but different possible paths, determines a particular path from the root of the structure tree to the location of the data segment. By means of this structural information, the various data segments in the structure tree are distinctly defined.

A further embodiment of the invention provides for ordering information to be stored for each data segment. This ordering information indicates how the individual data segments are associated with each other. By means of the ordering information, the data segments may be distinctly reassembled in the form of data fields.

Yet further embodiments of the invention provide as first ordering information, field data designating the data field and as second ordering information, sequence data indicating the order of the data segments in the data field.

Further embodiments and advantages of the invention will be described in detail below by way of an example with reference to the enclosed drawings, in which

BRIEF DESCRIPTION OF THE FIGURES

FIG. 2 shows a dictionary entry forming a data field, FIG. 3 shows the data segments of the data field of FIG. 2 with various items of structural information, FIG. 4 shows the meaning of the structural information of FIG. 3, FIG. 5 shows the data segments of the data field of FIG. 2 with the associated structural and ordering information.

DETAILED DESCRIPTION OF THE PREFERRED EMBODIMENTS

Figure 1:
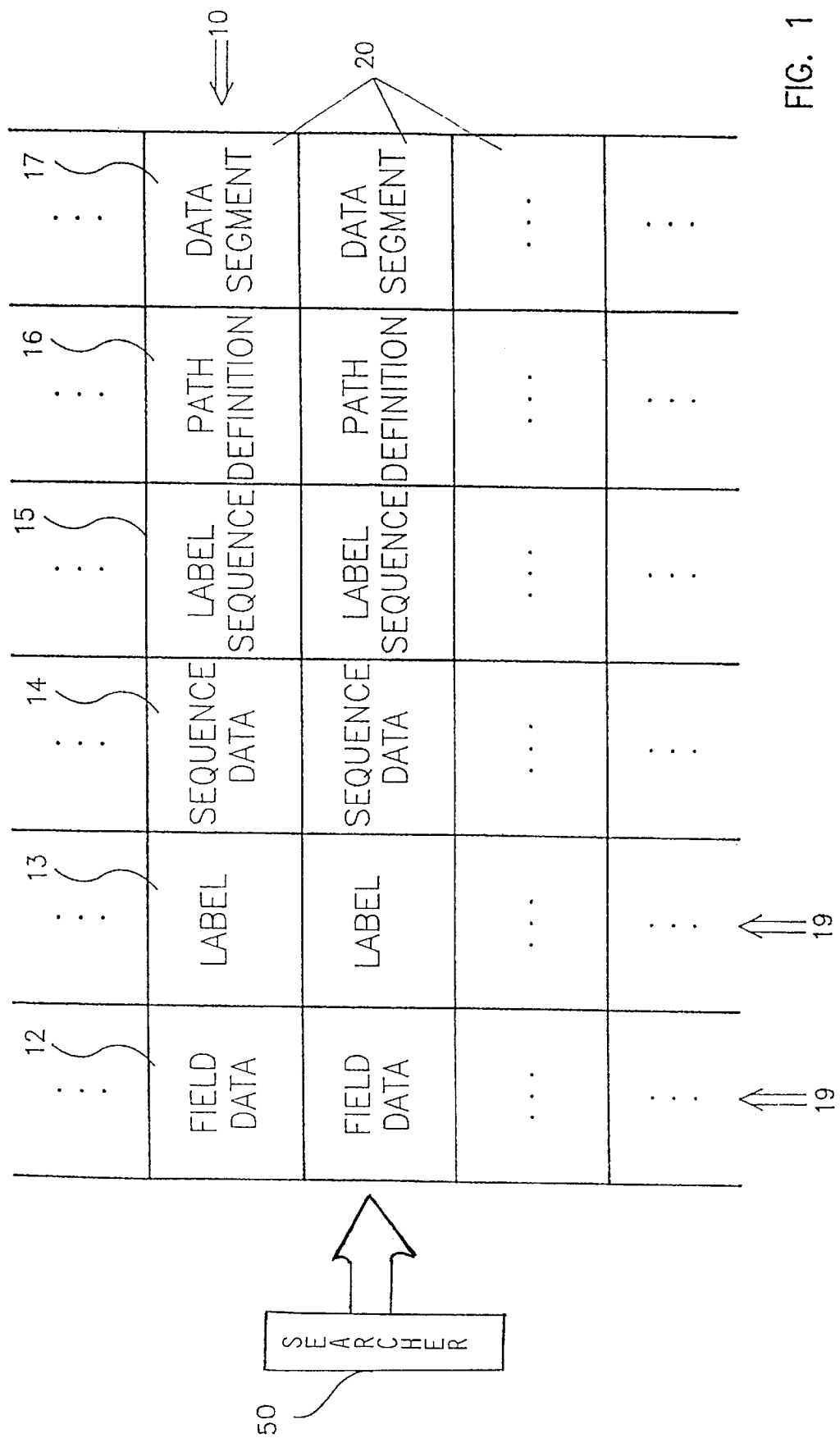
FIG. 1 is a schematic of a memory portion storing the data segments with the associated structural and ordering information.

The example described below concerns a database for administrating entries in a German dictionary. The dictionary entries consist only of text and thus are homogeneous as a data type. As will be described below, the dictionary entries are in the descriptive SGML language (Standard Generalized Markup Language).

The database comprises memory means for storing the dictionary entries. The memory means consist of a plurality of physically standardized memories. The manner in which the dictionary entries are stored in the memories will be described below with reference to FIG. 1.

FIG. 1 shows a memory portion divided into rows 10 and columns 19. Each row 10 contains field data 12, a label 13, sequence data 14, a label sequence 15, a path definition 16, and a data segment 17. Each column 19 contains either only field data 12 or only labels 13, etc. Several data segments 17 make up a data field 20. A database comprises a plurality of such data fields 20.

A single data field 20 contains a single dictionary entry. The data segments 17 of this data field 20 are particular text fragments of the dictionary entry, as will be described in detail below with reference to FIGS. 2 to 4.

FIG. 2 shows a dictionary entry for the word "abbrennen". This dictionary entry represents a data field 20. As indicated in FIG. 2, the dictionary entry is incomplete, as only the first 10 text fragments are represented.

FIG. 3, on the right, shows the individual text fragments of the dictionary entry "abbrennen". Each of these fragments represents a data segment 17. The labels 13 for the text fragments are shown on the left in FIG. 3. These labels 13 are in the previously mentioned descriptive SGML language. The totality of the labels 13 forms a structure tree whose leaves represent the individual text fragments.

The meaning of the individual labels 13 is shown in FIG. 4.

FIG. 4 shows, for example, that the label "<wortart_text>" represents text data of a word type. In FIG. 3, the text fragment "unr. V." appears under the label "<wortart_text>", the abbreviation "unr. V." standing for "irregular verb".

The text fragment "unr. V." is a leaf in the structure tree which is formed by the labels 13. The respective type of text fragment is described by the associated label 13. In the present example, the type of text fragment "unr. V." within the structure tree is described by the label "<wortart_text>".

The path from a leaf of the structure tree to its root is marked by the label sequence 15. This path may be seen from FIG. 3. As previously mentioned, the text fragment "unr. V." is a leaf in the structure tree. Starting from this leaf, the label "<wortart>" is the next indented label 13 after the associated label "<wortart_text>". This is followed by the label "<gr>" as the next indented label 13. Finally, labels "<hf>" and "<entry>" are the next indented labels 13. The label "<entry>" represents the root of the structure tree. The path from the label "<wortart_text>" to the root "<entry>" of the structure tree thus has the label sequence "<wortart> <gr> <hf> <entry>". The label "<wortart_text>" is not added to the label sequence 15, as it already forms the label 13 of the text fragment "unr. V.". The root "<entry>" of the structure tree is however part of the label sequence.

As previously mentioned in connection with FIG. 1, the label 13 and the label sequence 15 of a text fragment are stored amongst others in the memory of the database. This will be described in detail below with reference to FIG. 5.

FIG. 5 shows the text fragments of the dictionary entry of FIG. 2 which is stored in the memory of the database. As in FIG. 1, the individual rows 10 of the memory contain six entries each. The first row 10 contains all the entries for the text fragment "abbrennen". The second row 10 contains all the entries for the text fragment "unr. V.", etc.

The various text fragments belonging to the dictionary entry of FIG. 2, i.e., the entry "abbrennen", are marked by the same field data 12. In FIG. 5, this data is the number "471". As shown in that figure and as previously mentioned in conjunction with FIG. 1, the field data 12 appears in each row 10 of the memory.

Field data 12 serves to distinguish the different dictionary entries from each other.

According to FIGS. 5 and 1, the sequence data 14 is a further data item contained in row 10 of the memory. Each text fragment is associated with sequence data 14. As shown in FIG. 5, the sequence data 14 of the successive rows 10 consists of the numbers "100", "200", etc.

The sequence data 14 is used to determine the order of the individual text fragments within a dictionary entry. The order of the sequence data 14 corresponds to that of the text fragments of the dictionary entry of FIG. 2.

Label 13 and label sequence 15 have been previously explained with reference to FIGS. 3 and 4. In FIG. 5, row 10 of the memory contains the label "<wortart_text>" as label 13 and the label sequence "<wortart> <gr> <hf> <entry>" as label sequence 15. As has been previously explained and as shown in the second row 10 of FIG. 5, label 13 and label sequence 15, respectively, belong to the text fragment "unr. V.".

It may happen that the label sequence 15 of a dictionary entry 17 fails to define the path from a leaf to the root of a structure tree with the necessary clarity. This will be demonstrated below by way of an example. As shown in FIGS. 3 and 5, the label "<bed_text>" may be associated either with the text fragment "durch Brand zerstoeren, niederbrennen" or with the text fragment "durch Feuer von etw. befreien, reinigen, saeubern". In either case, the label sequence from the respective text fragment to the root of the structure tree is "<bed> <semu2p> <semu1p> <entry>". Thus, the exact path from the leaf to the root of the structure tree is not clearly defined.

For remedying this, i.e., for clearly defining the path from a leaf to the root of the structure tree, the path definition 16 is additionally provided. Path definition 16 is shown in the form of individual digits in FIG. 5. Each row 10 of the memory, i.e. each text fragment, is associated with a path definition 16.

The text fragment "durch Brand zerstoeren, niederbrennen" is associated with the path definition "11111" in FIG. 5. The text fragment "durch Feuer von etw. befreien, reinigen, saeubern" by comparison has the path definition "11211". Digit "2" in the second path definition 16 means that instead of following the first branch with the label sequence " . . . <semu2p> . . . ", the second branch with the label sequence 15 is to be selected. Path definition 16 serves to distinguish different paths with the same label sequence 15.

Finally, each row 10 of the memory shown in FIG. 5 contains the respective text fragment. As previously mentioned, a dictionary entry is made up of the totality of the text fragments.

In summary, the described database contains a plurality of data fields 20. Each data field 20 is subdivided into a plurality of data segments 17. In the database, each data segment 17 is associated with particular structural and ordering information. Field data 12 designating the individual data fields, as well as sequence data 14 determining the order of the data segments 17 within a data field 20, are provided as ordering functions. Label 13, label sequence 15 and path definition 16 act as structural information. The structural information serves to describe the type of data segments 17. The path from the location of the data segments 17 within a structure tree associated with the data field 20 to its root is also clearly defined.

In the described database, data fields 20 are provided as dictionary entries which comprise text fragments as data segments 17.

The described database may be processed in the manner described below.

For changing a row 10 of the memory, the user may cause that row to be displayed as part of the data field 20 and change the data, for example, data segment 17 or label 13 of row 10, by means of an editing system. The editing system ensures structural correctness on the basis of the admissible structure trees. The changed row 10 may then again be restored in memory.

For erasing a row 10 from memory, the editing system may be used in the above-described manner. The memory space previously needed for the erased row 10 then remains unoccupied.

For adding a row 10 to the memory, this may be done by the user editing the row 10 to be added with the aid of the editing system and by then storing it in the memory. For this purpose, a predetermined area remains unoccupied in each physically standardized memory. For additions, the row to be added may then be stored in the unoccupied memory area. This allows storing the row to be added in that memory in which other associated rows were previously stored. As will be explained below, a "clustered index" may be created in that manner.

For changing the structure of the database-stored data within the admissible structure trees, the structural information of rows 10 may be altered in the previously described manner. Accordingly, the structure of the memory-stored data may be altered by changing the ordering information of rows 10.

The number of admissible structure trees may be changed by means of the underlying grammar. This grammar defines the number of admissible structure trees and is also used by the editing system.

The described database may be searched by SQL (Standard Query Language) searcher 50 which is used as a standard in relational databases. By storing the structural and ordering information associated with each data segment 17, this information may also be used for searching.

Field data 12, label 13, label sequence 15, and data segment 17 in particular may be used for indexing. A query for the various dictionary entries or data fields 20 containing semantic text starting with "durch Brand zerstoeren" would then look as follows:

```
select *
from DATABASE
where
    field data in
        (select field data
        from DATABASE
        where
            label = "bed_text>" and
            data segment like "durch Brand zerstoeren%")
    order by field data, sequence data
```

By indexing label 13 and data segment 17, data fields 20 corresponding to the query are very rapidly found. Such data fields 20 are then ordered according to their field data 12. Within each data field 20, the individual data segments 17 are ordered according to their sequence data 14.

Thus, the field data 12 may be used as a "clustered index", which means that all the rows 10 with the same field data 12 are stored within a physically standardized memory. This ensures that a data field 20 stored under particular field data 12 is in a single physically standardized memory and thus rapidly available to the user. The "clustered index" avoids that a data field 20 to be output has to be invoked from several physically different memories.

We claim:

1. A computer system for storing a multiplicity of dictionary entries, said system comprising:
    a memory;
    a group of data structures stored in said memory for each of said dictionary entries, each of said data structures in each group comprising a root entry common for said group, a data segment entry for data, a label entry which indicates a type of said data and is a node in a label entry hierarchy, and a label sequence entry indicating a path of label entries in said label entry hierarchy between the label entry of said each data structure and said root entry, some of said data segments in each group collectively forming a word definition; and
    means for searching said data structures.

2. A computer system as set forth in claim 1 wherein the label sequence entries for two of the data structures in the same group are the same as each other, and each of said two data structures further comprises a path entry which distinguishes said same sequence entries from each other.

3. A system as set forth in claim 1 wherein said hierarchy comprises a main form label entry in a level, a lemmatized form label entry in a lower level descending from said main form label entry, and a grammatical detail label entry in said lower level descending from said main form label entry.

4. A system as set forth in claim 3 wherein said hierarchy further comprises a type of word label entry in a still lower level descending from said grammatical detail label entry.

5. A system as set forth in claim 4 wherein one of the data segments descends from said type of word label entry.

6. A computer system as set forth in claim 1 wherein said hierarchy comprises a semantic subdivision of a first category label entry in a level, a numerical information for said semantic subdivision of said first category label entry in a lower level descending from said semantic subdivision of said first category label entry, and a grammatical detail label entry in said lower level descending from said semantic subdivision of said first category label entry.

7. A computer system as set forth in claim 6 wherein said hierarchy further comprises an auxiliary verb label entry in a still lower level descending from said grammatical detail label entry.

8. A computer system as set forth in claim 6 wherein said hierarchy further comprises a semantic subdivision of a second category label entry in said lower level descending from said semantic subdivision of said first category label entry.

9. A computer system as set forth in claim 8 wherein said hierarchy further comprises a numerical information for said semantic subdivision of said second category label entry in a still lower level descending from said semantic subdivision of a second category label entry.

10. A computer system as set forth in claim 9 wherein said hierarchy further comprises a semantic information label entry in said still lower level descending from said semantic subdivision of said second category label entry.

11. A computer system as set forth in claim 1 wherein said hierarchy comprises a semantic subdivision of a category label entry in a level, a numerical information for said semantic subdivision of said category label entry in a lower level descending from said semantic subdivision of a category label entry.

12. A computer system as set forth in claim 11 wherein said hierarchy further comprises a semantic information label entry in said lower level descending from said semantic subdivision of a category label entry.

13. A computer system as set forth in claim 12 wherein said hierarchy further comprises an example label entry in said lower level descending from said semantic subdivision of a category label entry.

14. A computer system as set forth in claim 13 wherein data segments descend from label entries of said lower level.

15. A system as set forth in claim 1 wherein said hierarchy comprises a main form label entry in a level and a grammatical detail label entry in a lower level descending from said main form label entry.

16. A system as set forth in claim 15 wherein said hierarchy further comprises a type of word label entry in a still lower level descending from said grammatical detail label entry.

17. A system as set forth in claim 1 wherein said hierarchy comprises a grammatical detail label entry in a level and a type of word label entry in a lower level descending from said grammatical detail label entry.

18. A computer implemented method for storing and searching a multiplicity of dictionary entries, said method comprising the steps of:

storing in a memory a group of data structures for each of said dictionary entries, each of said data structures in each group comprising a root entry common for said group, a data segment entry for data, a label entry which indicates a type of said data and is a node in a label entry hierarchy, and a sequence entry indicating a path of label entries in said label entry hierarchy between the label entry of said each data structure and said root entry, some of said data segments in each group collectively forming a word definition; and searching through said memory for a specified combination of data segment and respective label entry.

* * * * *